US008521728B1

(12) United States Patent
Castello et al.

(10) Patent No.: US 8,521,728 B1
(45) Date of Patent: Aug. 27, 2013

(54) PROVIDING NATURAL PHENOMENA INFORMATION TO USERS

(75) Inventors: Cristiano Castello, San Jose, CA (US); Peter William Giencke, Mountain View, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 13/168,122

(22) Filed: Jun. 24, 2011

(51) Int. Cl.
*G06F 17/30* (2006.01)

(52) U.S. Cl.
CPC ................ *G06F 17/30017* (2013.01)
USPC ......................................... 707/723

(58) Field of Classification Search
USPC ............. 707/723, 728, 752; 702/2, 3, 179, 702/180, 182, 183, 184, 185
See application file for complete search history.

(56) References Cited

U.S. PATENT DOCUMENTS

| | | | | |
|---|---|---|---|---|
| 7,035,765 | B2 * | 4/2006 | Tanahashi | 702/183 |
| 7,107,152 | B2 * | 9/2006 | Fixman | 702/3 |
| 2003/0212493 | A1 * | 11/2003 | Tanahashi | 702/5 |
| 2004/0215483 | A1 * | 10/2004 | Fixman | 705/1 |

OTHER PUBLICATIONS

Stephan Diehl et al., Experience natural phenomena with virtual, constructed and mathematical models, 2003, IEEE, 778-781.*

* cited by examiner

*Primary Examiner* — Jean B Fleurantin
(74) *Attorney, Agent, or Firm* — Fenwick & West LLP (57) ABSTRACT

In one embodiment, a geographical information system provides information describing prominent cities that are susceptible (i.e., at risk) to transient natural phenomena as well as attributes of the phenomena. The geographical information system may provide the information to the user in an online map. Providing information about a transient natural phenomenon allows people to be aware of the phenomenon so as to better prepare for it.

22 Claims, 7 Drawing Sheets

PROVIDING NATURAL PHENOMENA INFORMATION TO USERS

TECHNICAL FIELD

The embodiments disclosed herein generally relate to providing information (data) related to natural phenomena using online information systems. More particularly, the embodiments herein relate to automatically determining prominent cities that are most susceptible to transient natural phenomena.

BACKGROUND

Transient natural phenomena such as hurricanes, tornados, tsunamis, earthquakes, volcanic eruptions, and the like can cause devastating damage to populated areas that are in the vicinity or path of these natural phenomena. To prepare the public for natural phenomena, various national, regional and scientific organizations monitor, track and predict the likely behavior of transient natural phenomena. These organizations provide information to the public about the behavior and location of a natural phenomenon to warn the public of any possible danger resulting from the phenomenon. While the information provided by these natural phenomena agencies is beneficial to the public, it does entail certain problems and inefficiencies. One such problem is the difficulty of predicting the path or extent of a natural phenomenon.

SUMMARY

The embodiments herein generally describe mechanisms that identify cities that are the most susceptible or in danger of a transient natural phenomena. A transient natural phenomenon is a naturally occurring physical event that is not produced by humans, but may pose danger to humans and/or property. Typically, these phenomena only occur for a limited duration of time lasting anywhere from a few seconds up to multiple days. Transient natural phenomena include meteorological phenomena such as hurricanes, tropical storms, typhoons, monsoons, snow storms, thunderstorms, and tornadoes as well as oceanographic phenomena such as tsunamis. Additionally, natural phenomena include geological phenomena such as volcanic activity and earthquakes.

In one embodiment, an online geographical information system receives natural phenomena data included in an online data feed from a natural phenomena monitoring organization such as the National Hurricane Center (NHC). The geographical information system converts the data into a mapping markup language which is used to generate online maps, using presentation elements of the markup language to indicate the current and/or potential future locations of a natural phenomenon. Based on the natural phenomena data, the geographical information system identifies an area of probable impact and cities that are within the identified area. The geographical information system calculates a score for each identified city that describes the city's prominence as well as the city's susceptibility to the natural phenomenon. That is, the score indicates the aggregate potential danger that the natural phenomenon poses to the people or property that are located in the city. In one embodiment, a city's prominence is correlated to the population of the city. The geographical information system provides users with maps and other online presentations based upon the natural phenomena data, where the presentations include the city of most importance in the area affected by the natural phenomenon as well as attributes that describe the characteristics of the natural phenomenon such as the wind speed, pressure, and intensity of a hurricane, for example.

In one embodiment, the geographical information system provides the natural phenomena data to a user in response to a user search request for location related information, where the user is not intentionally searching for natural phenomena data related to the location. For example, the user may request a map feature from the geographical information system, such as a request for a specific city in an online map. The geographical information system identifies general information related to the map feature as well as any natural phenomena data that is relevant to the search request if applicable. The geographical information system returns in the search results both the general information about the map feature as well as the natural phenomena data associated with the map feature. Thus, the geographical information system provides natural phenomena data that the user may not be aware of that is relevant to the request as well as the information sought out by the user. In one embodiment, the natural phenomena data is presented in an online map that displays the natural phenomenon and its attributes.

Alternatively, the geographical information system may automatically update a viewport of a user's client with natural phenomena data. The geographical information system monitors the viewport of the user's client to determine the geographical area displayed on an online map currently being viewed by the user. The geographical information system updates the online map with natural phenomenon data after determining that natural phenomena data is available for the geographical area displayed on the online map. By updating the online map with the natural phenomena data, the geographical information system informs the user viewing the map of the phenomenon occurring in the geographical area displayed on the map.

The features and advantages described in this summary and the following detailed description are not intended to be limiting. Many additional features and advantages will be apparent to one of ordinary skill in the art in view of the drawings, specification and claims.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
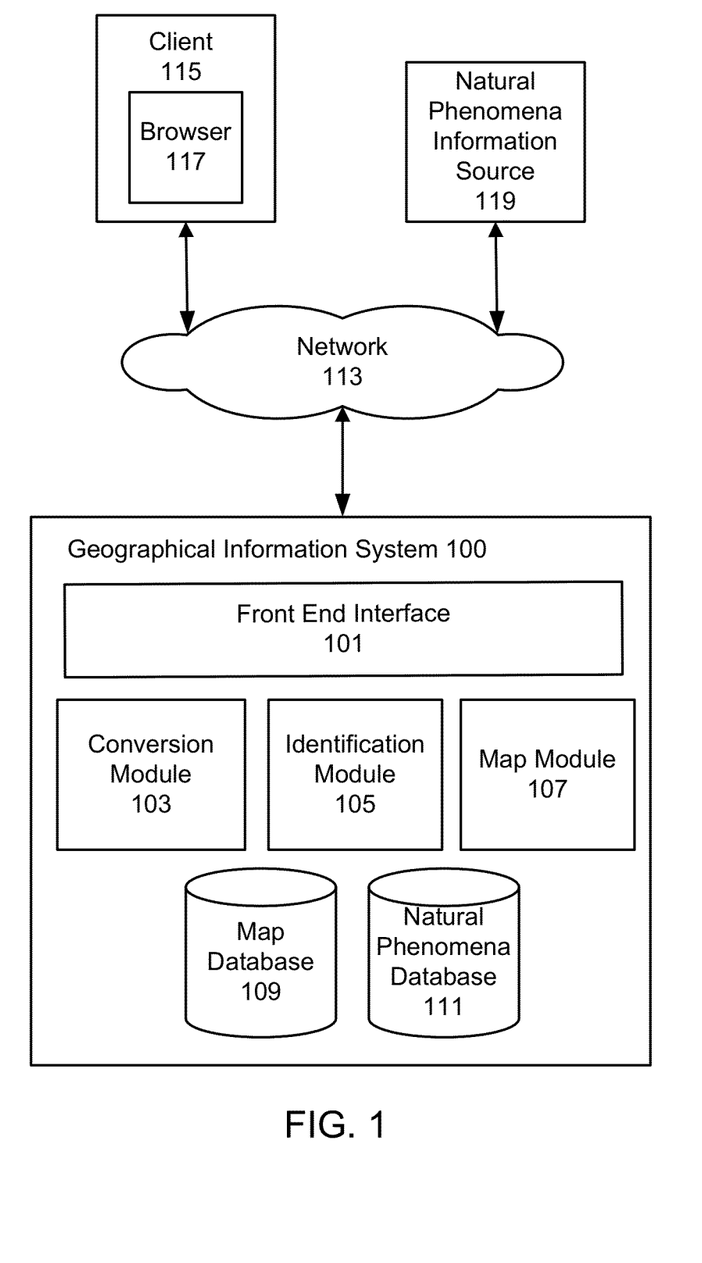
FIG. 1 illustrates a system architecture of a geographical information system according to one embodiment.

FIG. 1 illustrates a system architecture of a geographical information system 100 in accordance with one embodiment.

Generally, the geographical information system 100 provides information describing prominent cities that will be most impacted by transient natural phenomena as well as attributes of the phenomena. In one embodiment, a city's prominence is correlated to the city's population. The geographical information system 100 provides the information within an online map, but may provide the information via other means such as electronic mail (email), text message, or telephone call. Providing information about a transient natural phenomenon allows people to be aware of the phenomenon so as to better prepare for it.

In one embodiment, a transient natural phenomenon is a naturally occurring physical event that is not produced by humans, but may harm humans or property. In the discussion herein, natural phenomena will be generally discussed with respect to hurricanes, but it is understood that the mechanisms herein may be applied to any type of transient natural phenomena.

As shown in FIG. 1, the geographical information system 100 includes a front end interface 101, a conversion module 103, an identification module 105, a map module 107, a map database 109, and a natural phenomena ("NP") database 111. Each of these modules and databases is described in further detail below. Many conventional features, such as firewalls, load balancers, application servers, failover servers, site management tools and so forth are not shown so as not to obscure the features of the system.

In one embodiment, a suitable website for implementation of the geographical information system 100 is the GOOGLE™ Maps website, found at maps.google.com. Other map sites are known as well, and can be adapted to operate according to the teaching disclosed herein. The term "website" represents any computer system adapted to serve content using any networking protocol, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the geographical information system 100 is implemented as server program executing on server-class computer comprising a CPU, memory, network interface, peripheral interfaces, and other well known components. In one embodiment, the computers themselves run an operating system such as LINUX, Microsoft Windows, or Mac OS X, have generally high performance CPUs, 2G or more of memory, and 1TB or more of disk storage. Of course, other types of computers can be used, and it is expected that as more powerful computers are developed in the future, they can be configured in accordance with the teachings here. The functionality implemented by any of the elements can be provided by computer program products (e.g., as computer executable instructions) that are stored in non-transitory computer-readable storage mediums (e.g., RAM, hard disk, or optical/magnetic media).

In one embodiment, and as shown in FIG. 1, a client 115 executing a browser 117 or a map application connects to the geographical information system 100 to allow a user to view online maps provided by the geographical information system 100. The client 115 may connect to the geographical information system 100 via a network 113 such as the Internet or any combination of a LAN, a MAN, a WAN, a mobile, wired or wireless network, a private network, or a virtual private network. While only a single client 115 is shown in FIG. 1, in general very large numbers (e.g., millions) of clients are supported and can be in communication with the geographical information system 100 at any time. In one embodiment, the client 115 can be implemented using any of a variety of different computing devices, some examples of which are personal computers, digital assistants, personal digital assistants, cellular phones, mobile phones, smart phones and laptop computers.

The browser 117 may include any application that allows users of clients 115 to access web pages on the World Wide Web. Suitable applications include, but are not limited to GOOGLE CHROME, MICROSOFT INTERNET EXPLORER, NETSCAPE NAVIGATOR, MOZILLA FIREFOX, and APPLE SAFARI. The browser 117 allows the user of client 115 to access websites comprising online maps provided by the geographical information system 100 via a user interface provided by the front end interface 101. Through the interface 101, a user can view online maps provided by the geographical information system 100 that include transient natural phenomena data.

A natural phenomena information source 119 provides natural phenomena data to the geographical information system 100 via network 113. The natural phenomena information source 119 publicly distributes information about transient natural phenomena. The natural phenomena information source 119 may provide the natural phenomena data in various formats such as Really Simple Syndication (RSS) feeds, e-mail updates, plain text files, and/or Environmental Systems Research Institute (ESRI) data contained in shapefiles. Other file formats may be used in different embodiments. Examples of natural phenomena information sources 119 include the National Hurricane Center (NHC), the World Meteorological Organization (WMO), the National Earthquake Information Center (NEIC), and Pacific Tsunami Warning Center. While only one natural phenomena information source 119 is shown in FIG. 1, in general, any number of natural phenomena information sources 119 are supported and can be in communication with the geographical information system 100 at any time.

Generally, the natural phenomena data provided by the natural phenomena information source 119 describes attributes of transient natural phenomena. Attributes of a natural phenomenon generally depend on the phenomenon type and describe characteristics of the natural phenomenon. For a hurricane phenomenon, the attributes of the hurricane comprise the wind speed (miles or kilometers per hour) of the hurricane, the location of the center of the hurricane in terms of geospatial identifiers (e.g., latitude and longitude coordinates) at a given time, the heading or route of the hurricane, the central pressure of the hurricane, the hurricane intensity that characterizes the destructive potential of the hurricane, hurricane name, and/or hurricane identification number. In another example, for a tsunami phenomenon the attributes of the tsunami include the maximum water height (feet or meters) of the tsunami, speed (miles or kilometers per hour) of the tsunami at a given time, the magnitude of the earthquake that caused the tsunami, and/or the location of the source of the tsunami in terms of geospatial identifiers (e.g., latitude and longitude coordinates). For an earthquake phenomenon, the attributes may include the location of the source of the earthquake in terms of geospatial identifiers (e.g., latitude and longitude coordinates) and the magnitude of the earthquake that characterizes the relative size of the earthquake. Each natural phenomenon information source 119 provides a schema which describes the semantics of the phenomenon data that it publishes.

Geographical Information System

As shown in FIG. 1, the geographical information system 100 comprises a NP database 111. The NP database 111 stores natural phenomena data received from the natural phenomena information source 119 as described above in markup language format. In one embodiment, the markup language is the KML. KML is a file format used to display geographic data in the browser 117, and is described in U.S. Pat. No. 7,353,114, which is incorporated by reference herein. KML uses a tag-based structure with nested elements and attributes and is based on the extensible markup language (XML). In one embodiment, the NP database 111 stores the natural phenomena data received from the natural phenomena information source 119 for a hurricane or any other type of natural phenomenon in KML. A transient natural phenomenon is represented in KML as a placemark and the phenomenon's attributes are represented as a data name along with their corresponding value.

Below is an example KML file for Tropical Storm Aere:

```
<?xml version="1.0" encoding="UTF-8"?>
<kml xmlns="http://www.opengis.net/kml/2.2"
xmlns:gx="http://www.google.com/kml/ext/2.2"
xmlns:kml="http://www.opengis.net/kml/2.2"
xmlns:atom="http://www.w3.org/2005/Atom">
<Document>
  <Placemark>
    <name>Tropical Storm Aere</name>
    <description><![CDATA[ <img style="display:none"
width="1" height="1"
src="http://www.google.com/maps/gen_204?ct=google_earth:pop-
up&oi=events-
tropical_storms._._.xx.8854658a77382ede_xx&cad=lat:17.9,
lon:122.2,quad:02 303" />]]></description>
    <ExtendedData>
    <Data name="ADVISORY">
      <value>TROPICAL CYCLONE ADVISORY</value>
    </Data>
    <Data name="TCSPEED_MPH">
      <value>9.206</value>
    </Data>
    <Data name="EPOCH_TIME">
      <value>1304942400</value>
    </Data>
    <Data name="INTENSITY_MPH">
      <value>40.28</value>
    </Data>
    <Data name="LON">
      <value>122 .2</value>
    </Data>
    <Data name="STORMSRC">
      <value>RSMC Tokyo - Typhoon Center</value>
    </Data>
    <Data name="STORMTYPE">
      <value>Tropical Storm</value>
    </Data>
    <Data name="STORMNUM">
      <value>1101</value>
    </Data>
    <Data name="EXTENT">
    </Data>
      <Data name="BASIN">
    <value>wp</value>
    </Data>
    <Data name="MONTH">
      <value>May</value>
    </Data>
    <Data name="STORM_DESCRIPTION">
      <value>Tropical Storm</value>
    </Data>
    <Data name="TAU">
      <value>48</value>
    </Data>
    <Data name="STORM_HYPERLINK">
      <value>http://severe.worldweather.wmo.int/tc/wnp/in-
dex.html</value>
    </Data>
    <Data name="STORM_GRAPHIC">
    </Data>
    <Data name="STORMNAME">
      <value>AERE</value>
    </Data>
    <Data name="TCDIR">
    </Data>
    <Data name="DAY">
      <value>09</value>
    </Data>
    <Data name="MAXWIND">
      <value>35</value>
    </Data>
    <Data name="ADVISORY_LOCATION">
    </Data>
    <Data name="ADVISNUM">
    </Data>
    <Data name="YEAR">
      <value>2011</value>
    </Data>
    <Data name="BASIN_NAME">
      <value>West Pacific</value>
    </Data>
    <Data name="TCSPEED">
      <value>8</value>
    </Data>
    <Data name="MSLP">
      <value>996</value>
    </Data>
    <Data name="SS">
    </Data>
    <Data name="MAXWIND_MPH">
      <value>40.28</value>
    </Data>
    <Data name="INTENSITY">
      <value>35</value>
    </Data>
    <Data name="NEAREST_STATES">
    </Data>
    <Data name="LAT">
      <value>17.9</value>
    </Data>
    <Data name="HHMM">
      <value>1200</value>
    </Data>
    <Data name="LOCAL_TIME">
      <value>2011-05-09T21:00</value>
    </Data>
    <Data name="EXTENT">
      <value>(119.2, 125.2, 14.899999999999999,
20.899999999999999)</value>
    </Data>
    <Data name="NEAREST_CITY">
      <value>Amulung</value>
    </Data>
    <Data name="DISTANCE_FROM_NEAREST_CITY_MILES">
      <value>31</value>
    </Data>
    <Data name="DISTANCE_FROM_NEAREST_CITY_KM">
      <value>49</value>
    </Data>
    <Data name="DIRECTION_FROM_NEAREST_CITY">
      <value>East</valu
    </Data>
    </ExtendedData>
    <Point>
      <coordinates>122.2,17.9,0</coordinates>
    </Point>
  </Placemark>
</Document>
</kml>
```

In this example, the <kml> element contains a single <Placemark> element named Tropical Storm Aere. The placemark is used to mark the current position of the natural phenomenon, here Tropical Storm Aere, on an online map. The KML file for the natural phenomenon includes attributes for the tropical storm (hurricane) received from the natural phenomenon source 119. These attributes include the wind speed of the hurricane represented by the data name "MAX-WIND_MPH," the location of the hurricane in latitude and longitude coordinates represented by the data name "LAT" and the data name "LON," the local time associated with the attributes represented by the data name "LOCAL_TIME," and the date associated with the attributes represented by the data names "MONTH," "DAY," and "YEAR" as well as other attributes included above. Other attributes of the natural phenomenon are included in the example KML file shown above.

The map database 109 stores map information associated with map features that are displayed on digital or online maps. The map information defines parameters used to render map features for online maps as well as information associated with the map features such as businesses, restaurants, etc. associated with the map features. In one embodiment, a map feature represents a real world object that can be represented on an online map such as countries, provinces, islands, states, bodies of water, cities, natural features (e.g., mountain ranges), buildings, etc. The map database 109 may store the map feature information in a presentation independent format, or in a format suited for presentation, such as the aforementioned KML or other markup language.

In one embodiment, the conversion module 103 converts natural phenomena data received from the natural phenomena information source 119 into KML. The conversion module 103 requests natural phenomena data from the natural phenomena information source 119 at predetermined intervals of time. For example, the conversion module 103 may request natural phenomena data at an hourly, daily, or weekly basis. Any other suitable time interval can be used in other embodiments. Alternatively, the conversion module 103 may receive the natural phenomena data when it becomes available from the natural phenomena information source 119. That is, once natural phenomena data is available to the information source 119, the source 119 provides the data to the geographical information system 100.

To convert the natural phenomena data into KML, the conversion module 103 maps attributes of the natural phenomena data received from the natural phenomena information source 119 into their corresponding KML attributes. In one embodiment, the conversion module 103 accesses a set of rules that map each XML attribute included in the natural phenomena data into its associated KML attribute. For example, in an RSS feed the XML attributes for the location of a hurricane may be indicated as "latitude" and "longitude." The set of rules may associate these attributes to the KML attributes of "LAT" and "LON." Accordingly, the conversion module 103 converts the location data from the natural phenomena data into their associated KML format in this example. The particular rules for mapping or associated natural phenomenon data to KML attributes can be readily determined from the schema for each natural phenomenon information source 119.

The identification module 105 identifies automatically and periodically cities that are most susceptible to natural phenomena. More specifically, the identification module 105 identifies the most prominent city in terms of population that will be most impacted by the natural phenomena. For example, the identification module 105 automatically determines which prominent city is subject to a high degree of danger from an incoming hurricane, given a current natural phenomenon information data feed pertaining to a given hurricane. Continuing this example, consider a town with a population of 10 people that is directly in the path of a hurricane and New York City that is 100 km from the hurricane. Although New York City is less likely to be impacted by the hurricane compared to the town, the identification module 105 identifies New York City as the prominent city that will be most impacted by the hurricane. Because the population of New York City is much greater than the population of the town, more people are in New York City will be affected by the hurricane which results in New York City being identified as the most impacted city. Note that in other embodiments, prominence of a city may be based on other factors in combination with population.

The identification module 105 identifies the current location of the hurricane in terms of geospatial identifiers such as latitude and longitude coordinates. In one embodiment, the location of the hurricane corresponds to the circulation center or eye of the hurricane. The identification module 105 identifies from the map database 109 a list of cities that are within a threshold distance (e.g., 1,000 kilometers) from the hurricane's current location and are within the heading of the hurricane. The cities identified by the identification module 105 represent a candidate set cities which are susceptible to the hurricane because they are close to the hurricane in terms of distance. A larger threshold value increases the number of candidate cities to be evaluated, and a lower threshold value decreases them. Different threshold values can be used for different types of natural phenomena, e.g., 1,000 km for hurricanes, but only 200 km for tornadoes.

The identification module 105 calculates a locality score for each identified city in the list. The locality score for each city indicates a measure of the hurricane's impact on the city combined with a measure of the city's prominence. As previously mentioned, the prominence of a city corresponds to the population of the city. That is, the greater the population of the city the more prominent the city and vice versa. Other factors may be considered in other embodiments to determine the city's prominence. Generally, the higher the value of the locality score the more impacted the city will be due to the hurricane and vice versa. In one embodiment, the locality score for each city in the list is calculated according to the following variables determined for each city:

P: contribution of the population of the city to the locality score:

$$P = \left(\frac{\text{population}}{\text{Max}Pop}\right)^p$$

where population is the population of the city and MaxPop is a constant representing the most populated city of interest. Here, MaxPop is set at 32,000,000, which represents the population of the Tokyo metropolitan area, which is by some measures the most populous city in the world, and p is a constant weight set to 0.15. Note that in other embodiments other values can be used to represent the most populous city in the world and the weight.

T: contribution of time to the locality score:
$T=e^{\alpha(TimeLimit-time)}$ where re the time is the estimated time in hours until the hurricane comes into contact with the city, TimeLimit is a constant (e.g., 6 hours) and α is a constant weight. In one embodiment, α is 0.1 but can be other values in other embodiments. Note that if the hurricane's approach (i.e., comes into contact with the city) is less than TimeLimit, the time contribution T is set to 1;

E: contribution of the elevation of the city. Generally, a city is more susceptible to a hurricane if the city is close to sea level in terms of elevation. Thus, a city's higher elevation could mitigate the susceptibility of a city to a hurricane.

$E = e^{-\beta * elevation}$ where elevation is the city's elevation (e.g., meters) and is a constant weight. In one embodiment, $\beta$ is 0.01 but can be other values in other embodiments;

C: contribution of the city's distance to the nearest coastline. Generally, a city is more susceptible to a hurricane if the city is close to a coastline in terms of distance; $C = e^{-\chi * distanceToCoast}$ where distanceToCoast is the distance from the city (e.g., kilometers) to the nearest coastline and $\chi$ is a constant weight. In one embodiment, $\chi$ is 0.002 but can be other values in other embodiments.

B: contribution of the city's distance from the hurricane's projected path of travel or track.

$B = e^{-\lambda * distanceToProjectedPath}$ where distanceToProjectedPath is the closest distance (e.g., kilometers) from the city to the hurricane's projected path and $\lambda$ is a constant weight. In one embodiment, $\lambda$ is 0.02 but can be other values in other embodiments.

The relationship of these variables to each other in an exemplary embodiment is represented by the equation as follows:

$$localityScore = P*T*E*C*B$$

Thus, the identification module 105 calculates a locality score for each candidate city based on the above equation, or some similar function using the P, T, E, C, and B factors, or their equivalents. The identification module 105 ranks the candidate cities based on the locality score calculated for each candidate city. The identification module 105 determines the candidate city with the highest locality score, which is then deemed to be the most impacted city due to the natural phenomenon, here, a hurricane.

The identification module 105 updates the KML data for the natural phenomenon in the NP database 111 with an indication of the identified city that is most susceptible to the hurricane. For the KML example described above for Tropical Storm Aere, the identification module 105 may include in the KML file the attribute and value of:

```
<Data
    name="CITY_OF_GREATEST_IMPORTANCE">
    <value>Amulung</value>
```

In this example, the attribute "CITY_OF_GREATEST_IMPORTANCE" indicates that the city of "Amulung" is most impacted city due to the storm. Alternatively, the identification module 105 may update the KML data for the hurricane with a list of the cities with the highest locality scores (e.g., top three).

The map module 107 is any web-based application known in the art that provides online or digital maps and information about map features to users. Exemplary web-based applications include GOOGLE Maps and GOOGLE Earth. The map module 107 utilizes the map information in the map database 109 to generate two-dimensional and/or three-dimensional digital maps and populate the maps with map features.

In one embodiment, the map module 107 provides natural phenomenon data in online maps. Specifically, the map module 107 generates an online map that includes, as appropriate, the city which will be most impacted due to a natural phenomenon based on the natural phenomenon KML data stored in the NP database 111. Alternatively, the online map includes the top cities (e.g., N highest scoring cities) that will be most impacted due to the natural phenomenon or all the cities that that will be impacted due to the natural phenomenon. For example, the map module 107 accesses the hurricane's KML data as well as the map feature information from the map database 109 to generate an online map that includes the hurricane data for the geographical area represented by the map feature information. Where the hurricane's KML data lists the impacted cites, the map module 107 determines whether each of these cities is visible in the viewport for a requesting client, and if so, provides an appropriate graphical element for the hurricane.

Figure 2:
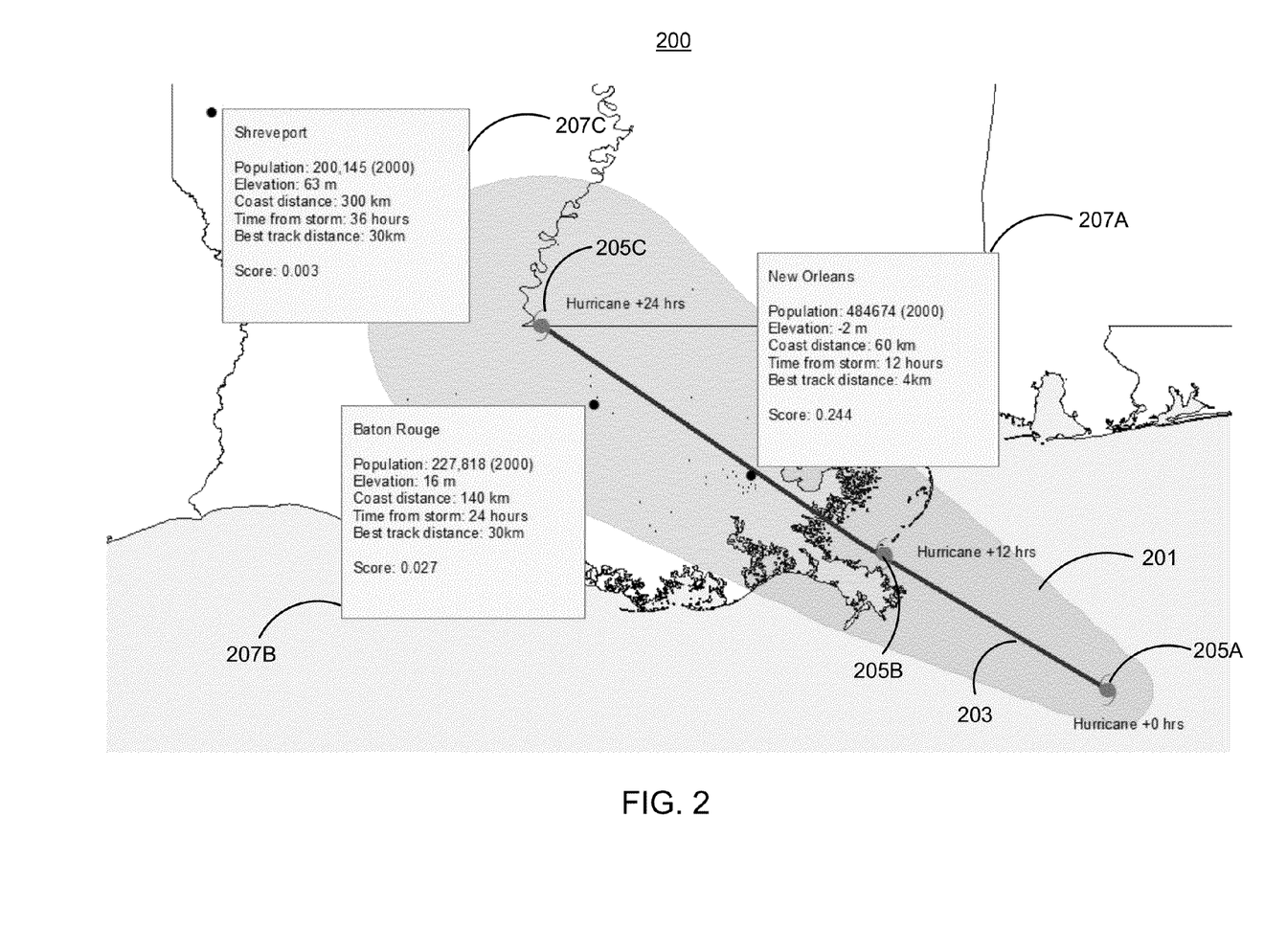
FIG. 2 illustrates an online map including a natural phenomenon forecast and the cities most impacted by the natural phenomenon according to one embodiment.

FIG. 2 illustrates one example of an online map 200 that includes hurricane data for the geographical area corresponding to Louisiana. As shown in FIG. 2, the online map 200 includes a hurricane cone 201 representative of Hurricane Bonnie. In one embodiment, a hurricane cone is a graphical representation of the probable position of the hurricane's circulation center over a period of time. The online map 200 illustrates a 24 hour forecast of the hurricane's trajectory 203 or track which describes the path of the hurricane as a function of time.

Specifically, map 200 displays the circulation center of the hurricane at three different time intervals: +0 hour, +12 hours, and +24 hours. Circulation center 205A represents the hurricane's center location when the hurricane formed and circulation center 205B represents the hurricane's center location after 12 hours from when the hurricane formed. Lastly, circulation center 205C represents the hurricane's location after 24 hours of the formation of the hurricane. While only a 24 hour forecast is shown in map 200, it is understood that the hurricane cone may illustrate a forecast for any number of days such as a three-day or five-day forecast.

The map module 107 creates the hurricane cone 201 by drawing circles (or other bounding shape, e.g., ellipse) centered at each forecast point: +0 hour, +12 hours, and +24 hours. In one embodiment, the radius of each circle at each forecast point is equal to two-thirds of the historical official forecast errors for the natural phenomena information source 119 for hurricanes during the preceding five year period in the geographical region. The map module 107 constructs the cone by drawing a tangent line that connects the outside boundary of all the circles.

In addition, the map 200 illustrates an example of a group of top cities that will be impacted by the hurricane: New Orleans, Baton Rouge, and Shreveport. For each city, the map module 107 provides an indication 207 of the values for the variables that are used to calculate each city's locality score as well as the city's locality score. As shown in the indication 207A, the city of New Orleans is most impacted by the hurricane based on the variables shown in the indication 207A such as population, elevation, coast distance, time from the storm, and the best track distance. In this example, New Orleans is associated with a locality score of 0.244 whereas Baton Rouge and Shreveport are respectively associated with the locality scores of 0.027 and 0.003. Because New Orleans is associated with the higher locality score, it is the city that is most impacted by the hurricane.

Figure 3A:
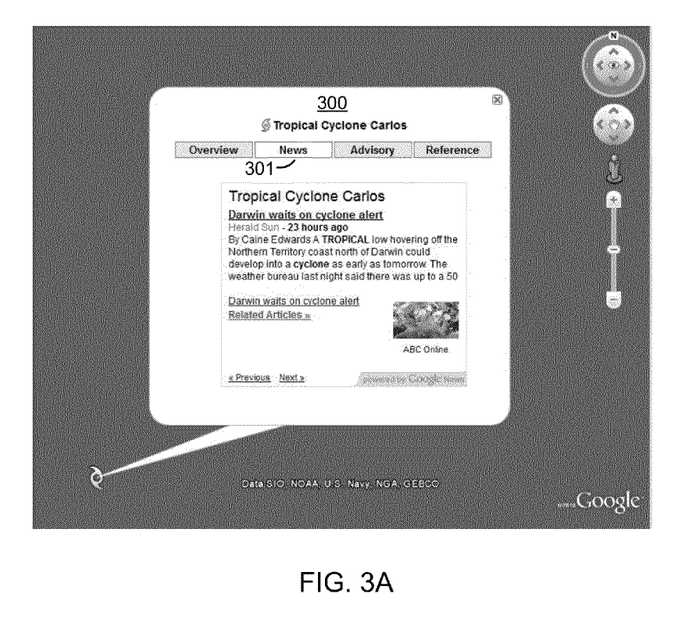
FIGS. 3A-3C illustrate examples of information windows that provide information about a natural phenomenon according to one embodiment.

In one embodiment, the map module 107 includes an information window in online maps that provides additional information about a hurricane, when the hurricane's current location puts it within the area being viewed in the viewport of the client. The information included in the information window comprises news related to the hurricane. In one embodiment, the map module 107 may obtain stored news that are related to the hurricane or may obtain the news from external sources. FIG. 3A illustrates an example of an information window 300 about the Tropical Cyclone Carlos. As shown in FIG. 3A, information window 300 comprises various tabs that are associated with information about the hurricane. In FIG. 3A, the news tab 301 is currently selected which causes the information window 300 to display a news article related to the hurricane.

Figure 3B:
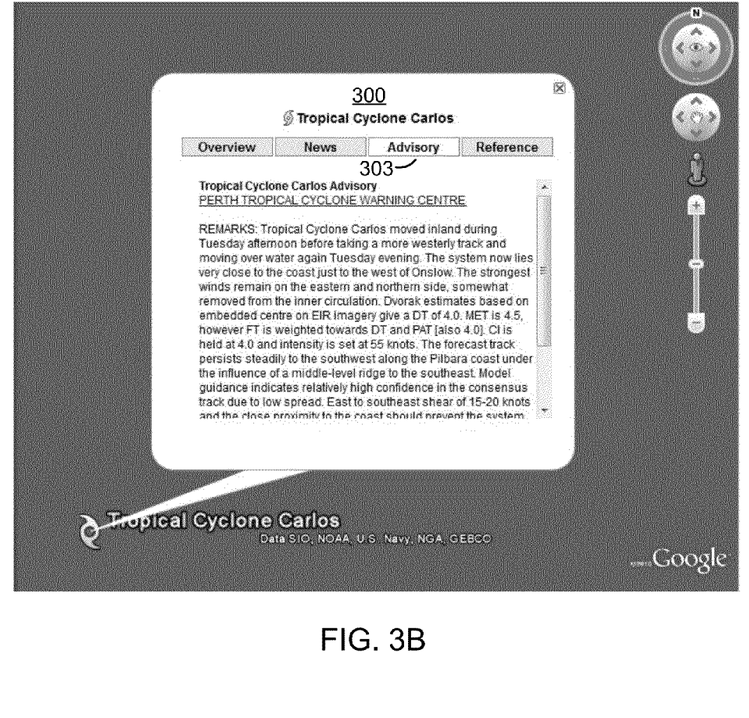

In one embodiment, the information included in the information window comprises a hurricane advisory received from the natural phenomena information source 119 which is stored in the NP database 111 for the phenomenon. A hurricane advisory includes remarks describing the hurricane's location, intensity, movement, and any precautions that should be taken. FIG. 3B illustrates the information window 300 displaying a hurricane advisory for Tropical Cyclone Carlos. In FIG. 3AB, the advisory tab 303 is selected which causes the advisory to be displayed in the information window 300.

Figure 3C:
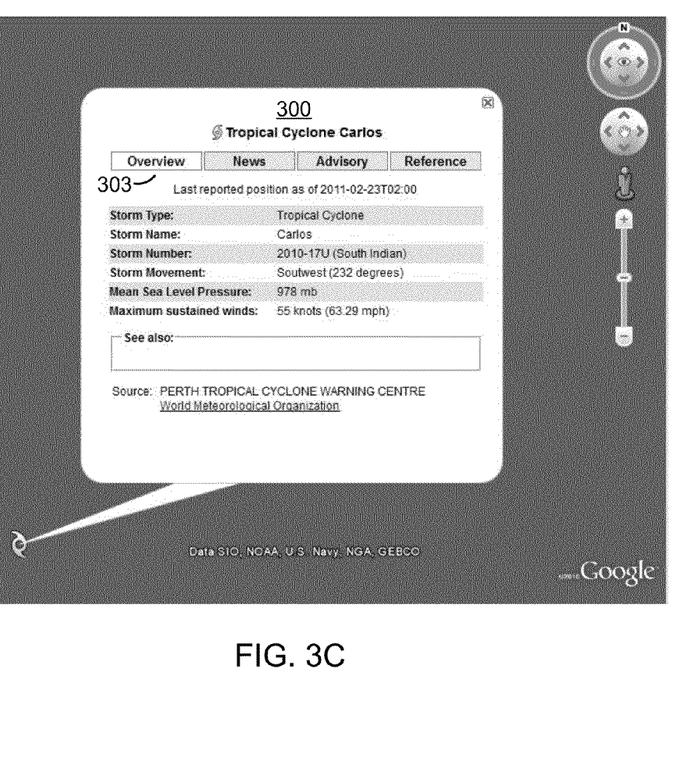

The information included in the information window may also comprise an overview of the hurricane. The overview describes the attributes of the hurricane stored in the NP database 111 including the name of the hurricane, hurricane number, movement, sea level pressure, and wind speed. FIG. 3C illustrates an overview of Tropical Storm Carlos in the information window 300. As shown in FIG. 3C, the overview tab 303 is selected which causes the information window 300 to display the overview information.

In one embodiment, the map module 107 provides hurricane data upon request from the client 115. The map module 107 may receive an explicit request for hurricane data from a client 115 such as a search for a hurricane that is currently occurring. Accordingly, the map module 107 generates an online map that includes the hurricane data as described above for display on the client 115.

Alternatively, the map module 107 may receive a search query for a map feature such as a city, state, country, province, or country from the client 115. In addition to providing the client 115 general information pertaining to the map feature (e.g., a city), such as associated businesses, the map module 107 provides the client 115 with any hurricane data that is related to the map feature if appropriate. Thus, the geographical information system 100 performs the two useful functions of providing search results related to the map feature as well as hurricane data related to the map feature.

Based on the search query, the map module 107 searches the NP database 111 for currently occurring hurricanes. The map module 107 identifies whether the requested map feature is susceptible to a hurricane as well as the city (or cities) that is most susceptible to the hurricane. If the requested map feature is not within the threshold distance of a hurricane, the geographical information system 100 provides the client 115 with search results associated with the map feature that do not include with hurricane data. However, if the requested map feature is within the threshold distance of the hurricane, the map module 107 determines the city that is most likely to be impacted by the hurricane and the map feature's likelihood of being impacted by the hurricane if the map feature is a city. The map module 107 provides search results to the client 115 including an online map with an indication of the most impacted city as well as hurricane data that is relevant to the search query to the client 115. If the requested map feature is a city, the map module 107 includes the requested city's susceptibility to the hurricane. Additionally, the search results may include other information pertaining to the search request for the map feature other than hurricane data.

Rather than providing hurricane data responsive to a search query, the map module 107 automatically updates currently viewed online maps at clients 115 with hurricane data if appropriate. In one embodiment, the map module 107 monitors the viewport of the browser 117 to identify the geographical area of an online map being viewed on the client 115. The map module 107 identifies from the NP database 111 whether a hurricane or other natural phenomenon is occurring in the geographical area. If so, the map module 107 updates the online map with the hurricane data described above such as the city that is most likely to be impacted by the hurricane as well as the hurricane cone illustrating the trajectory of the hurricane.

Note that the map module 107 may provide hurricane data to client 115 in other manners than an online map. For example, the map module 107 may send an e-mail, text message, and/or a cell phone call with the hurricane data to the client 115.

Process for Providing Natural Phenomena Data

Figure 4:
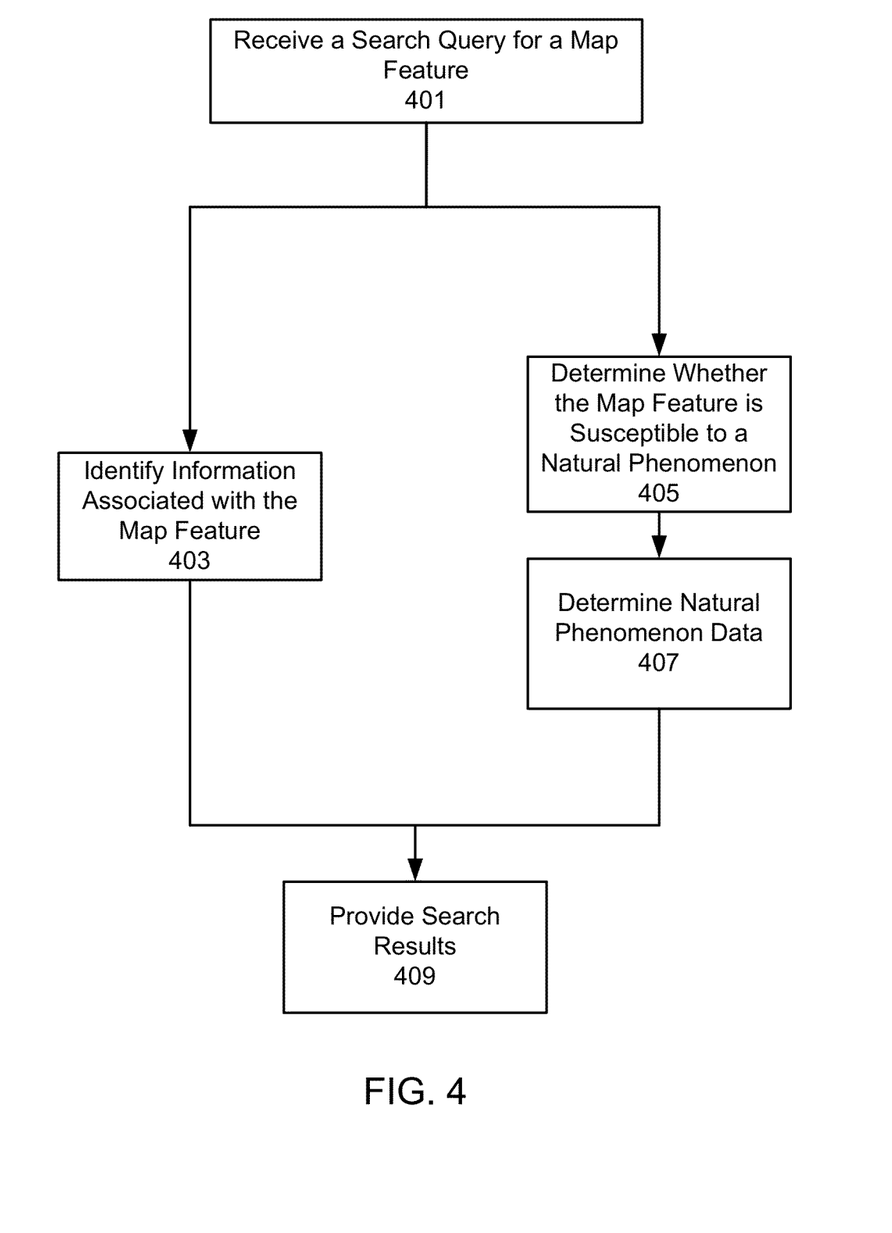
FIG. 4 illustrates a method for providing natural phenomena information related to a map feature according to one embodiment.

Referring now to FIG. 4, there is shown one embodiment of a computer-implemented method performed by the geographical information system 100 for providing natural phenomena data to a client 115. Note that in alternative embodiments, other steps may be performed other than those shown in FIG. 4.

Here, the geographical information system 100 receives 401 a search query for a map feature. The search query may be received from a client of user, in which case the query may represent a user's desire for information related to the map feature. Or the query may be received from another system, which generates the query automatically. The requested map feature may be a city, state, country, continent, province, island, or any other type of physical feature that can be represented on a map. The geographical information system 100 identifies 403 information associated with the map feature, and obtains its location (e.g., latitude and longitude, geocode, or other representation of location). The identified information is representative of general search results such as for example business or restaurants located in a city indicated in the query, news articles about the map feature, or general information about the map feature.

The geographical information system 100 simultaneously determines 405 whether the map feature is susceptible to a natural phenomenon. That is, the geographical information system 100 searches the NP database 111 to determine whether the map feature is within a threshold distance from a natural phenomenon that is currently occurring, based on the location of the map feature, and the current location of the natural phenomenon. If not, the geographical information system 100 provides 409 search results without any natural phenomenon data and include the identified information associated with the map feature.

However, if the map feature is likely to be impacted by the natural phenomenon by being within the appropriate threshold distance of the natural phenomenon, the geographical information system 100 determines 407 natural phenomenon data corresponding to the natural phenomenon such as the city that is most likely to be impacted by the natural phenomenon as well as attributes of the natural phenomenon. The geographical information system 100 provides 409 the search results to the client 115 to fulfill the search query. Thus, the search results include two types of useful information: general search results associated with the map feature and natural phenomenon data associated with the map feature if applicable. The user at client 115 is thus provided with hurricane data that is relevant to the search query even though the user was not explicitly seeking the hurricane data.

Figure 5:
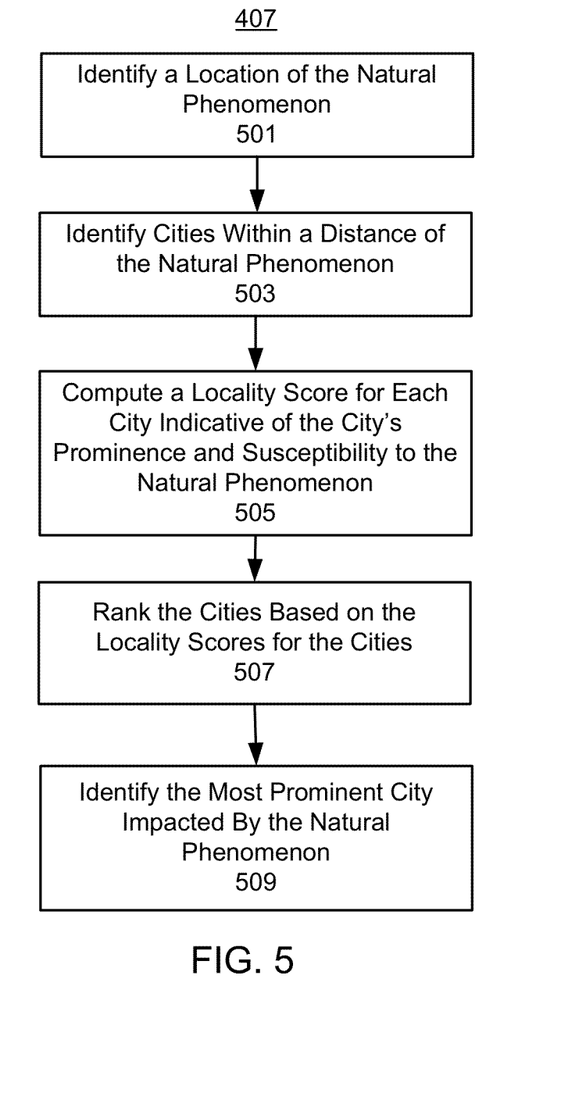
FIG. 5 illustrates a method for determining a city that is most susceptible to a natural phenomenon according to one embodiment.

Referring now to FIG. 5, there is shown one embodiment of a computer-implemented method performed by the geographical information system 100 for determining 407 natural phenomenon data. Note that in alternative embodiments, other steps may be performed other than those shown in FIG. 5.

In one embodiment, the geographical information system 100 identifies 501 a location of the natural phenomenon in terms of geospatial identifiers such as latitude and longitude coordinates, geocodes, or other equivalent location representation. The geographical information system 100 identifies 503 cities within a threshold distance of the natural phenomenon. For example, the geographical information system 100 identifies cities that are a threshold distance from the circulation center of a hurricane. The geographical information system computes 505 a locality score for each city that is indicative of the city's prominence and susceptibility to the natural phenomenon. The geographical information system 100 ranks 507 the cities based on the calculated locality scores for the cities. The geographical information system 100 identifies 509 the most prominent city that that will be impacted by the natural phenomenon based on the locality scores. That is, the geographical information system 100 identifies the city with the highest locality score relative to the other scores. The geographical information system 100 may alternatively identify the top cities that are likely to be impacted by the natural phenomenon. The identified city and attributes of the natural phenomenon are included in the search results that are transmitted to the client 115. If the requested map feature is a city, the geographical information system 100 includes in the online map the requested city's susceptibility to the natural phenomenon.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

We claim:

1. A computer-implemented method for automatically identifying a city that will be most impacted by a natural phenomenon, the method executed by at least one processor and comprising:
   identifying a location of a natural phenomenon;
   identifying a plurality of cities that are within a threshold distance from the location of the natural phenomenon;
   calculating scores for the plurality of cities, each score indicative of an impact of the natural phenomenon to a respective city associated with the score, and the score for the respective city calculated based at least in part on a population of the respective city and an amount of time until the natural phenomenon contacts the respective city;
   identifying a city that will be most impacted by the natural phenomenon using the calculated scores; and
   providing an online map to a client device of a user, the online map including a graphical representation of the natural phenomenon and an indication of the most impacted city due to the natural phenomenon.

2. The computer-implemented method of claim 1, wherein the natural phenomenon comprises one of a tropical storm, flood, or tsunami.

3. The computer-implemented method of claim 1, further comprising:
receiving data from a natural phenomena information source that describes attributes characterizing the natural phenomenon;
converting the received data from a first format to a second format that is distinct from the first format, where the second format is a markup language format; and
storing the data converted to the second format.

4. The computer-implemented method of claim 1, wherein calculating scores for the plurality of cities comprises for each city:
identifying a population of the city;
identifying an amount of time until the natural phenomenon contacts the city;
identifying an elevation of the city;
identifying a distance from the city to a nearest coastline;
identifying a distance from the city to a trajectory of the natural phenomenon; and
calculating the score for the city using the population, the amount of time, the elevation, the distance from the city to the nearest coastline, and the distance from the city to the trajectory of the natural phenomenon.

5. The computer-implemented method of claim 1, wherein identifying the city that is most susceptible to the natural phenomenon comprises:
ranking the plurality of cities based on the calculated scores; and
identifying the city associated with a highest score from among the calculated scores, the highest score indicative of the most impacted city that is most prominent in terms of population and susceptible to the natural phenomenon.

6. The computer-implemented method of claim 1, further comprising:
receiving a search query comprising a keyword representing a city;
identifying information associated with the city;
determining whether the city is one of the plurality of cites that is within the threshold distance from the location of the natural phenomenon;
responsive to determining that the city is one of the plurality of cities:
identifying the city's susceptibility to the natural phenomenon; and
providing search results to the client device comprising the identified information that is associated with the city and the city's susceptibility to the natural phenomenon.

7. The computer-implemented method of claim 1, wherein providing the online map comprises:
providing the online map to the client device of the user;
determining that the natural phenomenon is currently occurring in a geographical region within the online map provided to the client device; and
transmitting the graphical representation of the natural phenomenon and the indication of the city that is most susceptible to the natural phenomenon to update the online map currently displayed on the client device.

8. The computer-implemented method of claim 1, wherein the online map further includes attributes that describe characteristics of the natural phenomenon.

9. The computer-implemented method of claim 1, wherein the online map further includes an indication of a set of cities from the plurality of cities that will be impacted by the natural phenomenon.

10. The computer-implemented method of claim 1, wherein the online map further includes an indication of the plurality of cities that will be impacted by the natural phenomenon.

11. A computer program product comprising a non-transitory computer-readable storage medium containing executable computer program code for automatically identifying a city that will be most impacted by a natural phenomenon, the code when executed by a computer processor cause the processor to:
identify a location of a natural phenomenon;
identify a plurality of cities that are within a threshold distance from the location of the natural phenomenon;
calculate scores for the plurality of cities, each score indicative of an impact of the natural phenomenon to a respective city associated with the score, and the score for the respective city calculated based at least in part on a population of the respective city and an amount of time until the natural phenomenon contacts the respective city;
identify a city that will be most impacted by the natural phenomenon using the calculated scores; and
provide an online map to a client device of a user, the online map including a graphical representation of the natural phenomenon and an indication of the most impacted city due to the natural phenomenon.

12. The computer program product of claim 11, wherein the natural phenomenon comprises one of a tropical storm, flood, or tsunami.

13. The computer program product of claim 11, wherein the code further causes the processor to:
identify a population of the city;
identify an amount of time until the natural phenomenon contacts the city;
identify an elevation of the city;
identify a distance from the city to a nearest coastline;
identify a distance from the city to a trajectory of the natural phenomenon; and
calculate the score for the city using the population, the amount of time, the elevation, the distance from the city to the nearest coastline, and the distance from the city to the trajectory of the natural phenomenon.

14. The computer program product of claim 11, wherein the code further cause the processor to:
rank the plurality of cities based on the calculated scores; and
identify the city associated with a highest score from among the calculated scores, the highest score indicative of the most impacted city that is most prominent in terms of population and susceptible to the natural phenomenon.

15. The computer program product of claim 11, wherein the code further cause the processor to:
receive a search query comprising a keyword representing a city;
identify information associated with the city;
determine whether the city is one of the plurality of cites that is within the threshold distance from the location of the natural phenomenon;
responsive to determining that the city is one of the plurality of cities:
identify the city's susceptibility to the natural phenomenon; and provide search results to the client device comprising the identified information that is associated with the city and the city's susceptibility to the natural phenomenon.

16. The computer program product of claim 11, wherein the code further cause the processor to:
provide the online map to the client device of the user;
determining that the natural phenomenon is currently occurring in a geographical region within the online map provided to the client device; and
transmitting the graphical representation of the natural phenomenon and the indication of the city that is most susceptible to the natural phenomenon to update the online map currently displayed on the client device.

17. A computer system for automatically identifying a city that will be most impacted by a natural phenomenon, the system comprising:
at least one server computer comprising a computer processor, the computer processor configured to execute instructions stored on a computer-readable storage medium, the instructions when executed by the computer processor cause the processor to:
identify a location of a natural phenomenon;
identify a plurality of cities that are within a threshold distance from the location of the natural phenomenon;
calculate scores for the plurality of cities, each score indicative of an impact of the natural phenomenon to a respective city associated with the score, and the score for the respective city calculated based at least in part on a population of the respective city and an amount of time until the natural phenomenon contacts the respective city;
identify a city that will be most impacted by the natural phenomenon using the calculated scores; and
provide an online map to a client device of a user, the online map including a graphical representation of the natural phenomenon and an indication of the most impacted city due to the natural phenomenon.

18. The computer system of claim 17, wherein the natural phenomenon comprises one of a tropical storm, flood, or tsunami.

19. The computer system of claim 17, wherein the instructions further cause the processor to:
identify a population of the city;
identify an amount of time until the natural phenomenon contacts the city;
identify an elevation of the city;
identify a distance from the city to a nearest coastline;
identify a distance from the city to a trajectory of the natural phenomenon; and
calculate the score for the city using the population, the amount of time, the elevation, the distance from the city to the nearest coastline, and the distance from the city to the trajectory of the natural phenomenon.

20. The computer system of claim 17, wherein the instructions further cause the processor to:
rank the plurality of cities based on the calculated scores; and
identify the city associated with a highest score from among the calculated scores, the highest score indicative of the most impacted city that that is most prominent in terms of population and susceptible to the natural phenomenon.

21. The computer system of claim 17, wherein the instructions further cause the processor to:
receive a search query comprising a keyword representing a city;
identify information associated with the city;
determine whether the city is one of the plurality of cites that is within the threshold distance from the location of the natural phenomenon;
responsive to determining that the city is one of the plurality of cities:
identify the city's susceptibility to the natural phenomenon; and
provide search results to the client device comprising the identified information that is associated with the city and the city's susceptibility to the natural phenomenon.

22. The computer system of claim 17, wherein the instructions further cause the processor to:
providing the online map to the client device of the user;
determining that the natural phenomenon is currently occurring in a geographical region within the online map provided to the client device; and
transmitting the graphical representation of the natural phenomenon and the indication of the city that is most susceptible to the natural phenomenon to update the online map currently displayed on the client device.

* * * * *

UNITED STATES PATENT AND TRADEMARK OFFICE
CERTIFICATE OF CORRECTION

PATENT NO.         : 8,521,728 B1                     Page 1 of 1
APPLICATION NO.    : 13/168122
DATED              : August 27, 2013
INVENTOR(S)        : Cristiano Castello et al.

It is certified that error appears in the above-identified patent and that said Letters Patent is hereby corrected as shown below:

In the Claims:

Claim 6 at column 15, line 44, after "plurality of," delete "cites" and insert --cities--.

Claim 15 at column 16, line 61, after "plurality of," delete "cites" and insert --cities--.

Claim 16 at column 17, line 7, delete "providing" and insert --provide--.

Claim 16 at column 17, line 8, delete "determining" and insert --determine--.

Claim 16 at column 17, line 11, delete "transmitting" and insert --transmit--.

Claim 21 at column 18, line 24, after "plurality of," delete "cites" and insert --cities--.

Claim 22 at column 18, line 38, delete "providing" and insert --provide--.

Claim 22 at column 18, line 39, delete "determining" and insert --determine--.

Claim 22 at column 18, line 42, delete "transmitting" and insert --transmit--.

Signed and Sealed this
First Day of July, 2014

Michelle K. Lee
*Deputy Director of the United States Patent and Trademark Office*